United States Patent [19]

Smith et al.

[11] Patent Number: 4,642,636
[45] Date of Patent: Feb. 10, 1987

[54] METHOD AND APPARATUS FOR AUTO-CALIBRATION OF SIGNAL CONDITIONING ELECTRONICS

[75] Inventors: John R. Smith, Monroeville; Thomas J. Kenny, Pittsburgh; Kingsley F. Graham, Murrysville; James A. Neuner, Richland Township; Douglas A. Bauman, Monroeville; Timothy F. Thompson, Pittsburgh; William W. Wassel, Penn Township; Dhulipala M. Rao, Pittsburgh; David G. Theriault, Monroeville, all of Pa.

[73] Assignee: Westinghouse Electric Corp., Pittsburgh, Pa.

[21] Appl. No.: 567,456

[22] Filed: Dec. 30, 1983

Related U.S. Application Data

[63] Continuation-in-part of Ser. No. 552,232, Nov. 16, 1983, abandoned.

[51] Int. Cl.[4] .................. H04Q 9/00; G05B 23/02
[52] U.S. Cl. .................. 340/870.04; 340/870.11; 364/571
[58] Field of Search .................. 307/117; 340/870.04, 340/870.17, 825.06, 825.12, 825.13, 870.16; 364/151, 492, 513, 569, 571, 567

[56] References Cited

U.S. PATENT DOCUMENTS

| 3,357,007 | 12/1967 | Wike | 340/870.04 |
| 3,750,155 | 7/1973 | Oman | 340/870.04 |
| 4,027,145 | 5/1977 | McDonald | 364/151 |
| 4,200,933 | 4/1980 | Nickel | 364/571 |
| 4,246,641 | 1/1981 | Babil | 364/571 |
| 4,310,893 | 1/1982 | Loshbough | 364/567 |
| 4,368,510 | 1/1983 | Anderson | 364/151 |
| 4,400,694 | 8/1983 | Wong | 340/825.12 |
| 4,459,259 | 7/1984 | Colley | 364/492 |
| 4,532,601 | 7/1985 | Lenderking | 364/571 |
| 4,549,180 | 10/1985 | Masuda | 340/870.04 |

Primary Examiner—John W. Caldwell, Sr.
Assistant Examiner—Michael F. Heim
Attorney, Agent, or Firm—Daniel C. Abeles

[57] ABSTRACT

Numerous signal conditioning circuits on a plurality of printed circuit boards are calibrated remotely by a signal processing unit which sends coded signals to each board, either sequentially or in parallel, to connect either on-board or off-board test signals to one of the conditioning circuits in place of its field generated input. The processing unit utilizes the actual and expected responses of each conditioning circuit to low and high test signals to generate a gain and an offset which are applied to the conditioned field signal to provide a calibrated signal. The time constant for each conditioning circuit is also measured periodically, or upon a selected temperature change, for use in generating a minimum waiting period for obtaining valid data following transfers between the field generated signals and the test signals.

20 Claims, 7 Drawing Figures

METHOD AND APPARATUS FOR AUTO-CALIBRATION OF SIGNAL CONDITIONING ELECTRONICS

CROSS-REFERENCE TO RELATED APPLICATIONS

This a continuation-in-part of U.S. patent application Ser. No. 552,232 filed on Nov. 16, 1983, now abandoned.

BACKGROUND OF THE INVENTION

This invention relates to electrical data acquisition and control systems and more particularly to methods and apparatus for remotely monitoring and calibrating signal conditioning circuits for such systems.

Modern process plants and other complex automated systems require the gathering of data from a large number of sources throughout the installation. The data gathered typically includes various analog signals such as temperatures, pressures, flows, fluid levels et cetera, and digital signals which indicate a condition or status such as whether a pump is off or on, or whether a valve is opened or closed et cetera. The signals are generated by sensors located throughout the plant and transmitted by field wiring to central locations where the signals are used in control systems, monitoring systems and/or protective systems. Typically, the raw signals on the field wiring are applied to conditioning circuits which provide protection against surges and filtering to remove electromagnetic interference. Also, the conditioning circuits often provide electrical isolation between the field wiring and the processing or control equipment that utilize the conditioned electrical signals. Conditioning also can include translating low level signals, such as those generated by thermocouples, to the high level signals required by the downstream equipment. The conditioning circuits are usually mounted on printed circuit boards with several circuits, depending upon their complexity, to a board. Often the boards will carry potentiometers which are used to manually calibrate and adjust the span of the individual signals. The filters used in the various conditioning circuits have time constants which require a settling interval when making adjustments in the circuits. The time constants for the different circuits can vary widely. While one could simply use the longest time constant to establish a settling time which would be suitable for all the circuits, this practice can greatly extend the time required for calibration in a large system having 200 to 300 circuits. It is preferable therefore, to establish a minimum reasonable settling time for each circuit. A minimum settling time cannot just be set and forgotten, however, because the time constant can change with changes in temperature and over a period of time. In addition, excessive noise on a particular circuit may require an increase in the time constant in a filter circuit. In either case, it has heretofore been necessary for a technician to make a physical change in the circuitry.

SUMMARY OF THE INVENTION

According to the invention, signal conditioning circuits on printed circuit boards, such as would be used in a data aquisition or control system, are calibrated automatically at preselected intervals of time and/or when the temperature of the circuits varies a preselected amount, such as about 10° Fahrenheit. The circuits are calibrated sequentially under the direction of a processing unit by applying test signals to their inputs in place of the field generated signals and calculating a gain and offset as a function of the relationship between the test signals and the outputs generated thereby. The processing unit sends coded signals to each of the printed circuit boards indicating the conditioning circuit or channel on the board which is to be calibrated, whether an external or on-board test signal is to be used, and, in the case of the on-board test signal, whether a high or low signal is to be applied. The individual conditioning circuits or channels on each board are calibrated sequentially but one channel on each of several, or all, of the boards can be calibrated simultaneously which greatly reduces processing time in a system having several hundred channels.

Since the conditioning circuits contain reactive elements, the processing unit waits after a transfer between the field generated and test signals is made to allow the output of the conditioning circuit to settle. In order to assure that sufficient time has been allowed for each output to settle, but without wasting a great deal of time as would occur if a single waiting period long enough to cover all the channels were used, a separate, adaptive settling period is generated for each channel. The waiting period is determined by calculating the time constant from the response of the individual conditioning circuit to a transfer between test signals, or by direct measurement taking successive samples until the change is sufficiently settled and noting the time required. The waiting or settling period is set long enough to provide the desired accuracy. For instance, the output signal of a conditioning circuit containing a single pole filter will be at least 99% settled at the end of a period of about 5 times the time constant. For 99.99% accuracy, the waiting period should be made equal to about 9 time constants. If two or three pole filters are used in the conditioning circuits, the waiting period could be shortened since these filters settle more rapidly.

The present invention provides automatic calibration of the numerous channels in a large data acquisition or control system. It is capable of calibrating the printed circuit boards serially or in parallel although only one channel at a time on each board is switched into test mode so that cross-talk or short circuits between channels can be detected. It provides an adaptive settling period for each conditioning circuit which is automatically updated when required so that the time required for acquiring valid calibration data is minimized. In addition, the invention permits the elimination of potentiometers on the printed circuit boards and provides for recalibration when time and temperature warrant it. At the same time, it does not require switching at the output terminals of the conditioning circuits so that isolation is maintained.

DESCRIPTION OF THE PREFERRED EMBODIMENT

Figure 1:
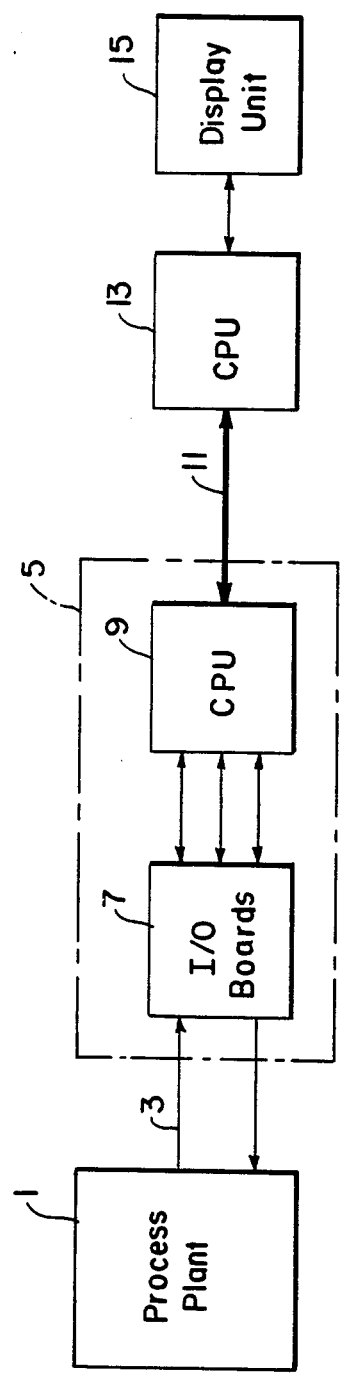
FIG. 1 is a schematic diagram in block diagram form of a portion of a plant monitoring system incorporating the present invention.

The invention will be described as applied to a plant safety monitoring system for a nuclear power plant, however, it is to be appreciated that it was designed as a robust, general purpose data acquisition and/or control system suitable for many other applications. The nuclear power plant, which is represented by the block 1 in FIG. 1, utilizes thermal energy generated by fission reactions in a nuclear reactor to drive a turbine-generator combination which in turn produces electric power. The operation of the plant is closely controlled within specified operating limits by a control system (not shown separately). The plant safety monitoring system shown in FIG. 1, monitors the operation of the plant and presents an on-line representation of the plant safety status to the operator and others. The system includes many transducers, meters, switches, et cetera, which monitor selected parameters throughout the plant such as pressures, temperatures, flows, the status of valves (open or closed) and pumps (off or on), and transmits signals representative of the current state of these parameters over field wiring 3 to a remote processing unit 5 which includes input/output circuitry 7 and a central processor unit (CPU) 9. As will be more fully explained below, the remote processing unit conditions and processes the raw electrical signals from the various sensors and transmits the conditioned and processed signals over a data link 11 to another multi-channel CPU 13. The CPU 13 generates information representative of the safety status of the plant 1 and presents it on display unit 15. In a complete system, there are several, for example four, remote processing units 5, which provide conditioned and processed sensor signals to two CPU's 13 which exchange information and provide data for a pair of display units 15. However, for the purpose of understanding this invention, which resides in the remote processing units 5, the system of FIG. 1 has been simplified.

Figure 2:
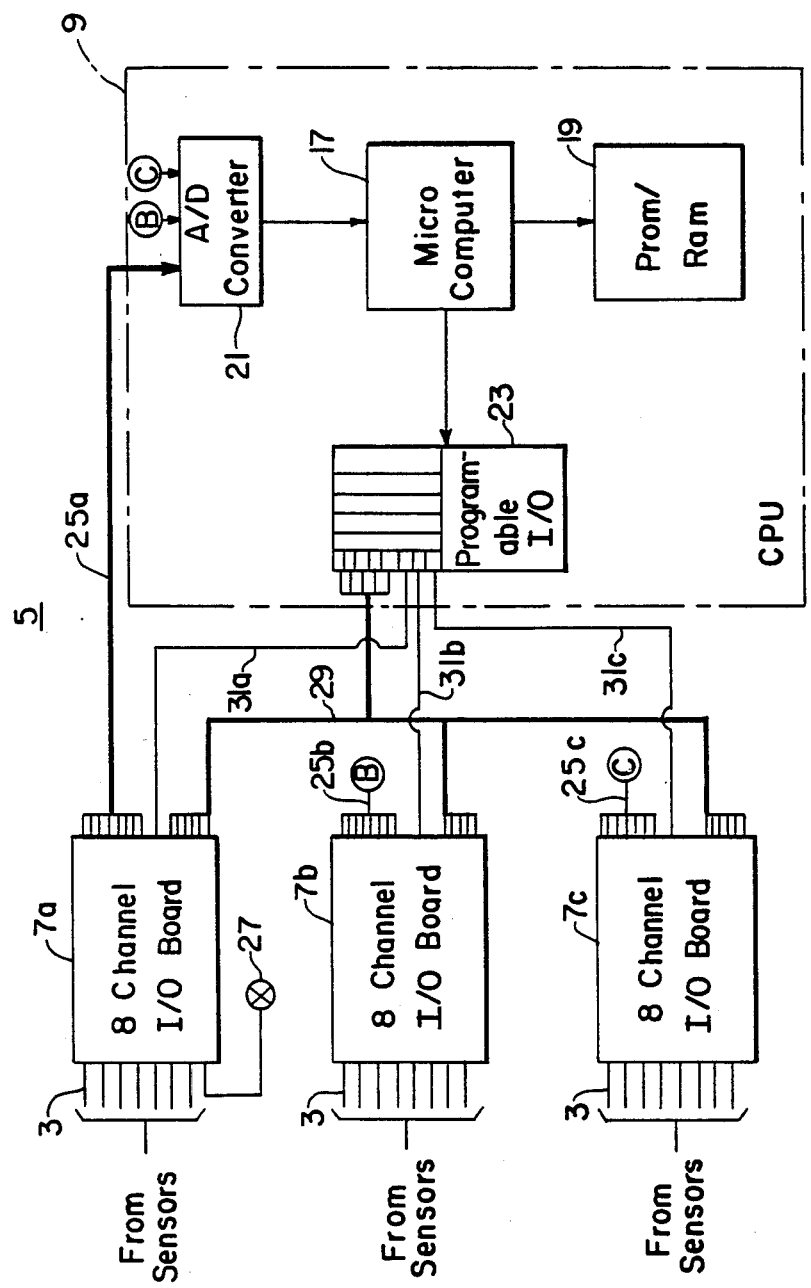
FIG. 2 is a schematic diagram of a remote processing unit in accordance with the teachings of the invention which forms a part of the plant monitoring system illustrated in FIG. 1.

The remote processing unit 5 is shown in more detail in FIG. 2. The CPU 9 includes a microcomputer 17 with programmable read only memory (PROM) and random access memory (RAM) 19, an analog to digital (A/D) converter 21 and a programmable output device 23 all of which are mounted on a microcomputer chassis housed in an instrument cabinet (not shown). The cabinet also houses a large number of printed circuit input-/output (I/O) boards such as 7a, b and c. On these boards are the circuits which condition the raw electrical signals transmitted over the field wiring 3. Each printed circuit board includes separate circuits or channels for a number of raw electrical signals; the number depending upon the type of sensor generating the signal. Typically, each board has 8 channels although some have only four. The conditioned signals are transmitted from the printed circuit boards 7 over cabling 25 to the A/D converter 21 for entry into the microcomputer 17. As can be seen from FIG. 2, one of the raw signals supplied to the I/O board 7a is generated by a temperature sensor 27 which monitors the ambient temperature of the boards 7. This signal is conditioned in the same manner as correstonding signals from the plant and is transmitted to the microcomputer 17 over the cabling 25 where it is processed like the other signals. As will be seen, this temperature reading is utilized to initiate calibration of the conditioning circuits.

The microcomputer 17 performs several functions including limit checking on the inputs, conversion of all inputs to their respective engineering unit values, diagnostic testing of the CPU components, and communication with the CPU 13 associated with the display unit 15. It also directs the testing of the conditioning circuits on the printed circuit I/O boards 7 and applies compensation to the conditioned signals. All of this is accomplished for a typical system having 150 analog and 100 digital inputs in a nominal one second cycle time.

In the usual connection for testing and calibration of the conditioning circuits, the microcomputer 17 generates commands which are transmitted to the programmable I/O device 23 as eight bit words. The device 23 contains a number of eight bit storage registers with each bit of each register connected to an output port. Each eight bit register controls three of the eight chanel I/O boards 7 with five of the eight bits connected in parallel to each of the boards 7a, b, and c through cabling 29 and each of the remaining bits connected exclusively to only one of the I/O boards 7 through a cable 31a, b or c.

Figure 3:
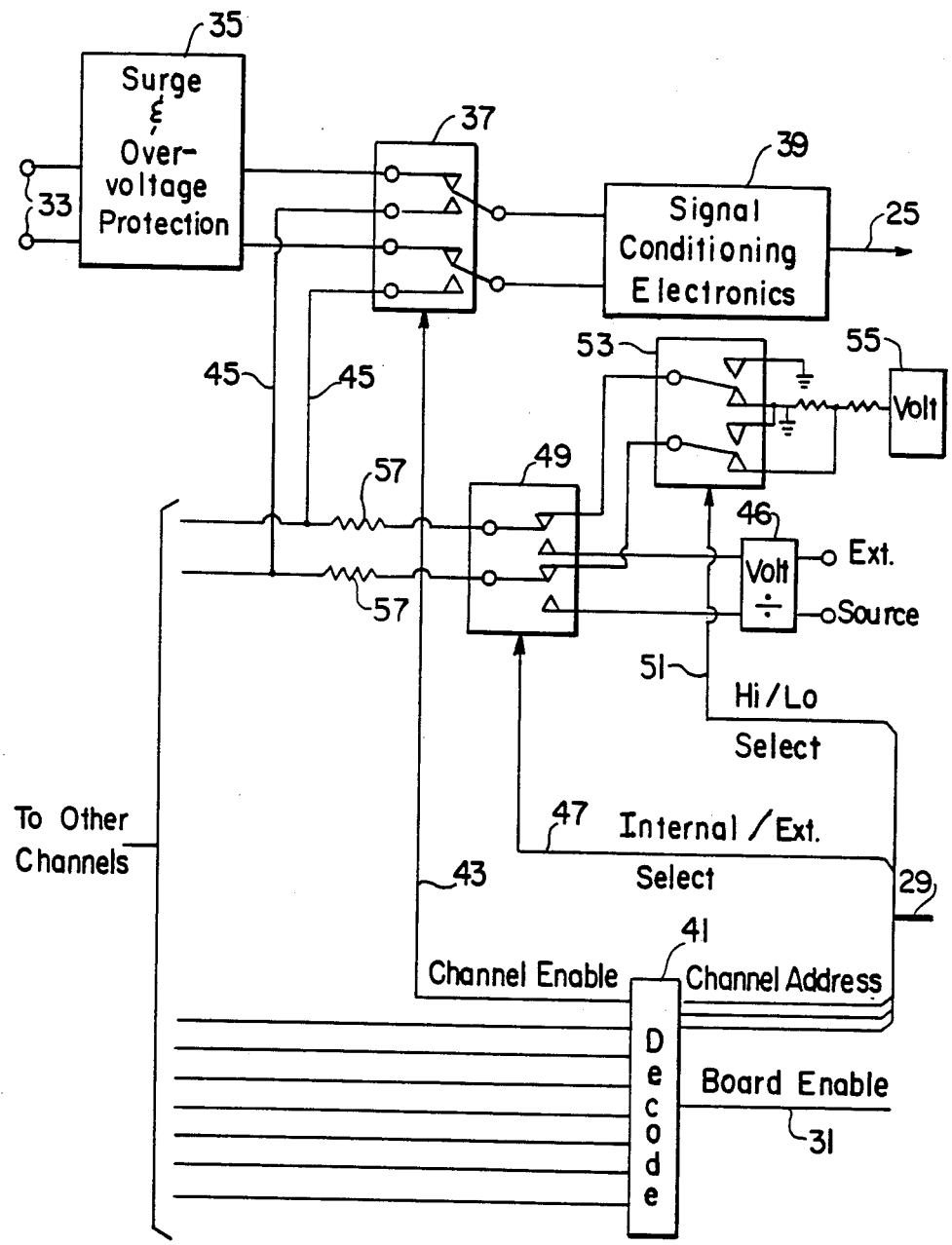
FIG. 3 is a schematic diagram illustrating some of the details of a printed circuit board which forms part of the remote processing unit of FIG. 2.

FIG. 3 illustrates schematically a typical channel on an I/O board 7 together with the control circuitry for that board. The channel includes input terminations 33 to which the raw signal carried by the field wiring 3 is applied. The raw signal passes through circuitry 35 which provides surge and overvoltage protection for the channel. With the double pole, double throw test injection relay 37 deenergized as shown in FIG. 3, the two wire signal is applied to the signal conditioning circuits 39. These conditioning circuits typically include filtering, amplification if required, and common mode isolation. The conditioned signal is then transmitted to the CPU 9 over cabling 25.

When the microcomputer determines that the illustrated channel is to be tested, it inserts the appropriate eight bit word into the register of the programmable I/O device 23 associated with that printed circuit board 7. Three of the bits of that word, which are transmitted over the cable 29 common to three of the printed circuit boards, determine the address of the channel to be tested and are applied to a decoder 41. The decoder has eight output leads 43 each connected to the coil of the test injection relay 37 in one of the channels. Another of the bits of the eight bit register of the programmable output device 23 provides a "board enable signal" to the decoder 41 over the dedicated cable 31. The decoder gates this board enable signal to the coil of the test injection relay of the selected channel. With the relay 37 energized, the raw signal applied to the input terminals 33 of the selected channel is removed and the test bus 45 is connected to the signal conditioning electronics 39. Another bit of the output register of device 23 is applied through the common cable 29 to an "internal-/external select" lead 47 which is connected to the coil of an internal/external select relay 49 on the board. If this signal is active, the relay 49 is energized to connect an external source to the test bus 45 through a voltage divider 46. This permits a technician to inject a test signal of any desired magnitude, such as a National Bureau of Standards traceable calibration signal, into the selected channel and could also be used to inject a test signal of variable magnitude as determined by the microcomputer. When the "Internal/External select" signal is inactive, the relay 49 is deenergized to connect an on-board generated test signal to the test bus 45. A "high/low select" test signal which is also generated by the eight bit word in the programmable output device 23 and transmitted over the common cabling 29 is applied to a "Hi/Lo select" lead 51 which is connected to the coil of an on-board "Hi/Lo select" relay 53. When the "Hi/Lo select" signal is active, the relay 53 is energized to ground both leads of the test bus 45 so that a test signal with a value of zero is injected into the signal conditioning electronics 39, except in the case of a bipolar input scale, for which a jumper connection causes the low setting to be negative full scale instead of zero. When the "Hi/Lo select" signal is inactive, relay 53 is deenergized as shown in FIG. 3, and an on-board voltage source 55 is applied to the signal conditioning electronics. Resistors 57 in the test bus 45 match the impedance seen by the signal conditioning 39 in the test mode to that presented by the surge and overvoltage protection circuit 35 in the normal mode. The test bus 45 is connected to the test injection relays 37 of all the other channels on the same board; however, the selected test signal is only applied to the channel which has been selected by the decoder 41 to have its relay 37 energized by the enable signal from lead 31.

Figure 4:
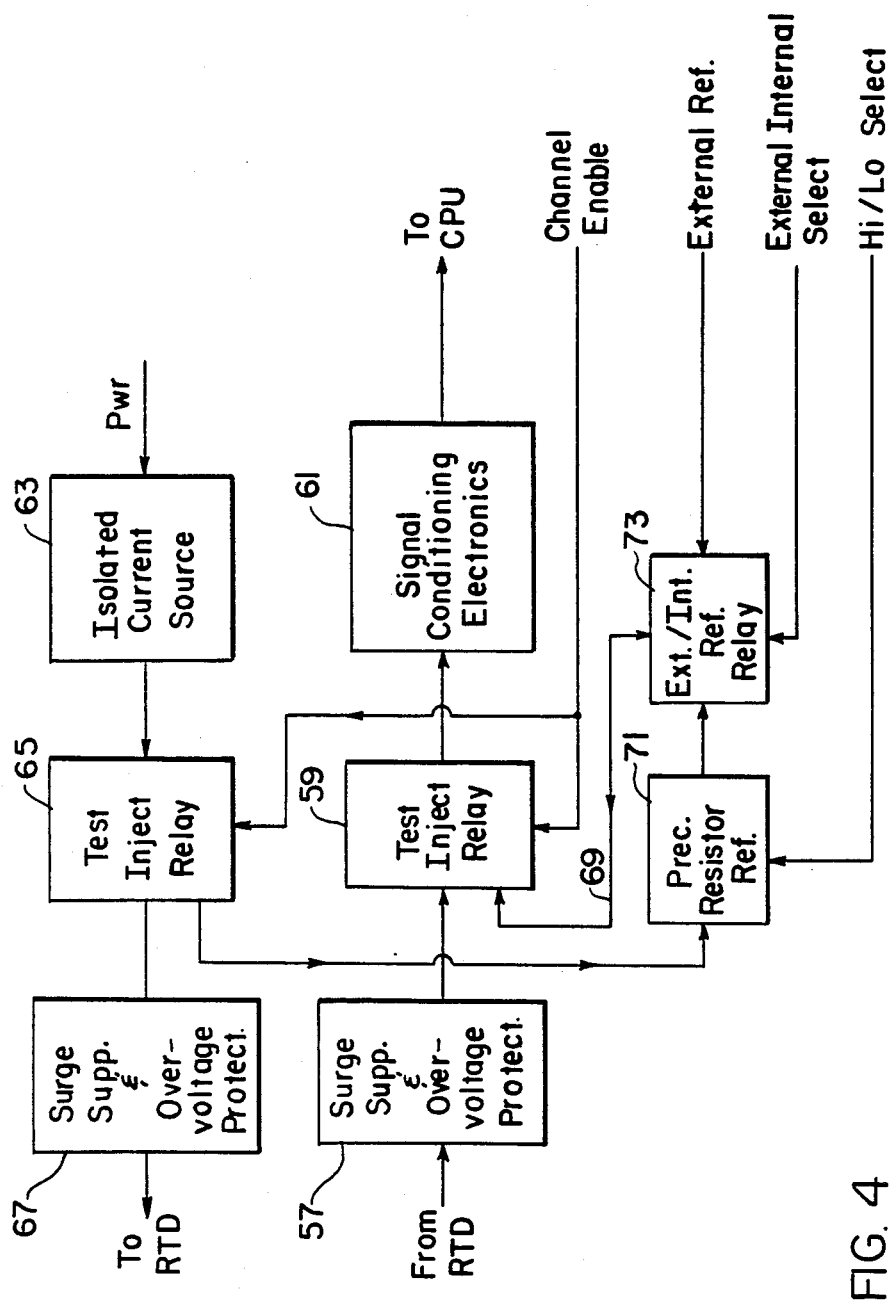
FIG. 4 is a schematic diagram in block diagram form of the details of another type of printed circuit board which forms a portion of the remote processing unit of FIG. 2.

The resistance temperature detector (RTD) channels are somewhat different due to the need to provide a current source for the sensor. As shown in block diagram form in FIG. 4, these channels which have surge suppression and overvoltage protection circuits 57, a test injection relay 59, and signal conditioning electronics 61 for the output signal of the RTD, also have an isolated current source 63, a second test injection relay 65 and surge suppression and overvoltage protection circuits 67 for energizing the RTD. When the channel enable signal goes active, both test injection relays 59 and 65 are energized to respectively, connect the test bus 69 to the signal conditioning electronics 61 in place of the RTD voltage signal and connect the current source 63 to one of two precision resistors in block 71 in place of the RTD. The selection of the appropriate precision resistor is determined by the "Hi/Lo select" signal. The resistance values are selected so as to generate signals which represent the full scale high and low readings expected from the RTD. This is a four wire measurement circuit with separate contacts of the relays switching each lead to thereby maintain calibration accuracy despite variations in contact resistance. If desired, the test signal generated by the on-board current source and precision resistors can be replaced by an external reference signal, if the "External/Internal reference relay" is energized by a signal on the "External-/Internal select" line. Since the RTD channels require additional circuitry, only four channels are provided per board and hence, only a two digit channel address signal need be applied to the decoder (not shown) for these boards.

It should be evident from the above, that only one channel at a time can be put into test mode on any one board. By monitoring the remaining channels in addition to the one under test, any cross-talk or short circuits between channels can be detected. While the individual channels on a board must be tested serially, one channel on each board can be tested simultaneously with channels on other boards. Within any group of three printed circuit boards though in the one configuration shown, only the corresponding circuits on each board can be tested simultaneously.

Figure 5:
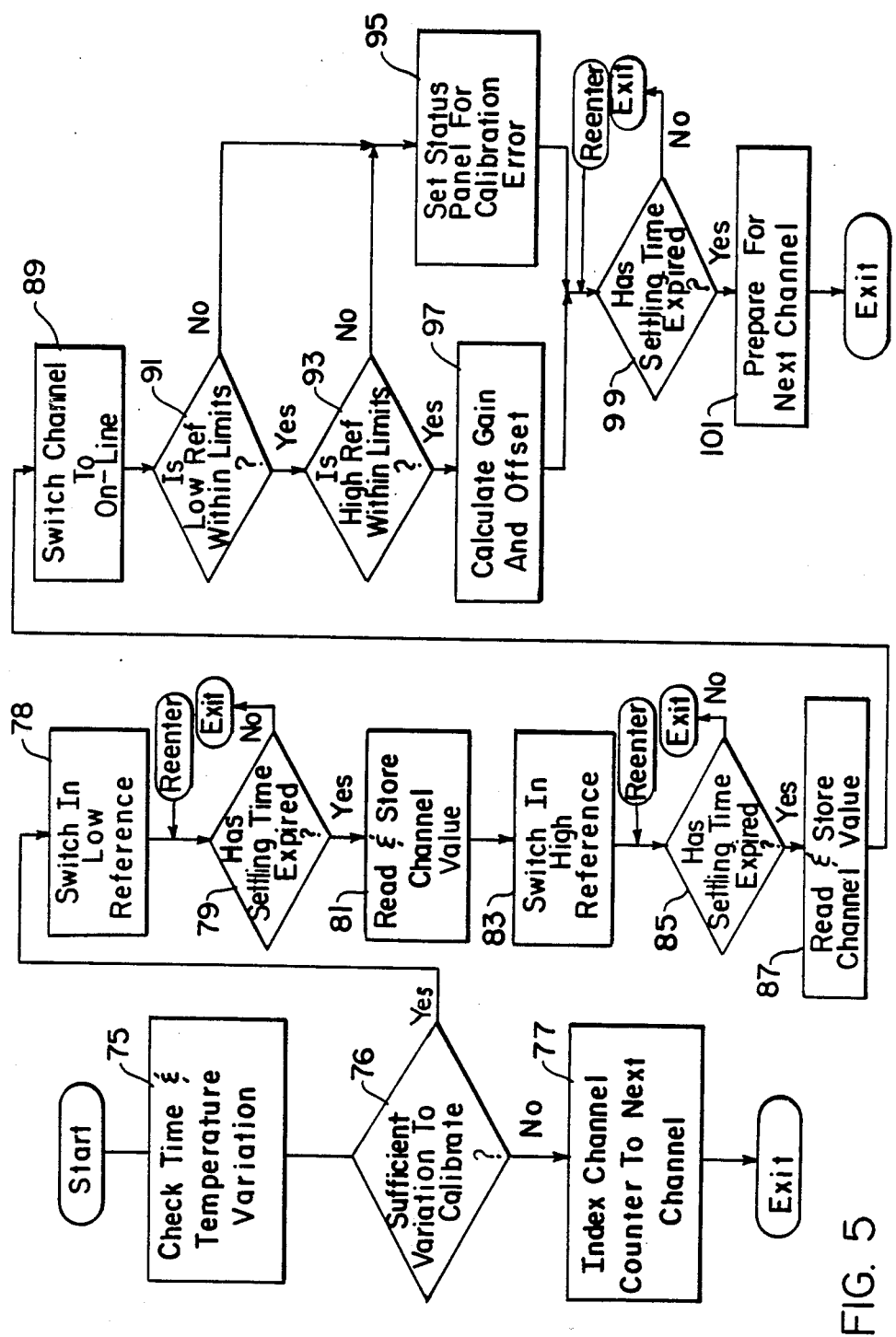
FIG. 5 is a flow chart illustrating the manner in which the remote processing unit of FIG. 2 operates in accordance with the teachings of the invention.

Testing and calibration of the numerous channels is carried out under the direction of the microcompuer 17. A flow chart illustrating how this is accomplished is shown in FIG. 5. First it should be explained that due to the time constants of some of the components of the conditioning circuitry, such as low pass filters, a settling time must be provided following the switching between the field generated signals and the test signals, and vice versa, to allow equilibrium to be established before any meaningful readings can be taken. For the various circuits, these settling times may vary anywhere from about 3 seconds to 10 seconds. Since it is not productive to tie up the microcomputer waiting for these settling times to expire, the self-test, self-calibrate program is performed in a manner which is transparent to the remaining software. By this it is meant that once each cycle, i.e. each second, the self-test, self-calibrate program is called up. When the program reaches a point where it is to wait for a settling time which has not yet expired, it exits this program and performs its other tasks. When it returns to this program on the next cycle, it enters at the point it left and rechecks to see if the settling interval has expired. If not, it again goes to other tasks and repeats the sequence until the settling time has expired and it can advance to the next step.

Turning to FIG. 5, the first step in the self-test, self-calibrate program is to check the time and temperature variation since the last calibration was performed as indicated by block 75. The temperature which is monitored is the ambient temperature to which the printed circuit I/O boards 7 carrying the conditioning circuits are exposed as measured by the transducer 27 in FIG. 2. If the temperature has not changed by a preselected amount since the last calibration, for instance plus or minus 10° Fahrenheit, or a predetermined time period has not elapsed, such as 8 or 24 hours, all as determined in block 76, the counter which indicates the next channel to be calibrated is incremented in block 77 and the program is exited.

If the time or temperature variation is sufficient for another calibration, the low reference is switched in as indicated in block 78 by sending to the programmable I/O device 23 an 8 bit word which identifies the proper channel address, sets the signal on the "high/low select" lead 51 to active to energize the "high/low select" relay 53 and sets the board enable signal active to energize the proper test inject relay 37. This disconnects the raw electrical signal from the signal conditioning electronics 39 and in its stead applies a test signal of zero value. The program then moves to block 79 where it is determined that the appropriate settling time has not yet expired and the program is exited. On subsequent cycles, the program is reentered at block 79 and again exited until the settling time has expired. When this occurs, the program advances to block 81 where the conditioned test signal generated by the channel in response to the low reference signal is read and stored. Next, the high reference signal is switched in as indicated in block 83 by generating a zero in the appropriate bit of the programmable I/O device 23 so that the signal on the high/low select lead 51 (see FIG. 3) goes inactive to deenergize the "high/low select" relay 43 and thereby switch the high reference signal into the signal conditioning electronics. The program then cycles in and out at block 85 waiting for the settling time to expire. When the signal conditioning electronics settle down, the output generated by the high reference signal is read and stored as indicated in block 87 and then the channel is switched back to on-line status in block 89 by canceling the board enable signal to deenergize the test injection relay 37.

While the on-line signal is settling, a check is made in blocks 91 and 93 respectively to determine whether the output signals generated by the low and high references read and stored in blocks 81 and 87 are within preselected limits. If either of them is not, an alarm signal is sent to the operator's status panel indicating the error. However, if both signals are within limits, the gain and offset errors for the channel being tested are calculated in block 97 in a manner to be discussed below.

Following calculation of the gain and offset in block 97 or the setting of the alarm in block 95, the program waits at block 99 for the settling time for the raw electrical signal, which was switched back on-line at block 89, to settle down. When this occurs, the program prepares for calibrating the next channel in block 101. This includes such steps as releasing the output from the channel just tested for output to the CPU 13 and display unit 15, advancing the channel counter to the next channel to be calibrated and performing a number of house keeping chores such as setting a number of flags used during the self-test, self-calibration program.

Figure 6:
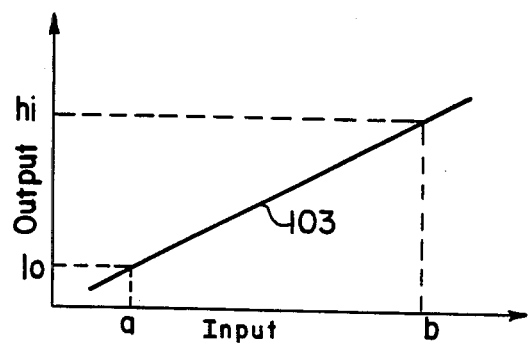
FIG. 6 is a plot showing the scheme used by the flow chart of FIG. 5 to calibrate conditioning circuits which form a part of the remote processing unit of FIG. 2.

The gain and offset calculated by the self-test, self-calibration program are applied to the signal generated by the associated conditioning channel to generate a calibrated signal for the parameter being monitored. The gain and offset which are determined in block 97 of the program are calculated as follows. It is assumed that the signal generated by the conditioning circuit is linear between the low and high limits. The relationship between the values of the actual outputs generated by low and high reference signals injected into the conditioning circuit and the expected inputs are shown graphically in FIG. 6. The line 103 represents the transfer function for any value of the input signal. The equation for this line is in the form:

$$y = gx + c \qquad \text{(Equation 1)}$$

Substituting the variables a and b, for the low and high reference signals and the measured output full scale low and high values, lo and hi, the following equations are obtained:

$$lo = g^*a + c \qquad \text{(Equation 2)}$$

$$hi = g^*b + c \qquad \text{(Equation 3)}$$

or $$c = lo - g^*a \qquad \text{(Equation 4)}$$

$$c = hi - g^*b \qquad \text{(Equation 5)}$$

Solving equations 4 and 5 simultaneously for g yields the gain, g:

$$g = (hi - lo)/(b - a) \qquad \text{(Equation 6)}$$

Substitution of this value into either of the equations 4 or 5 will provide the offset value c.

Figure 7:
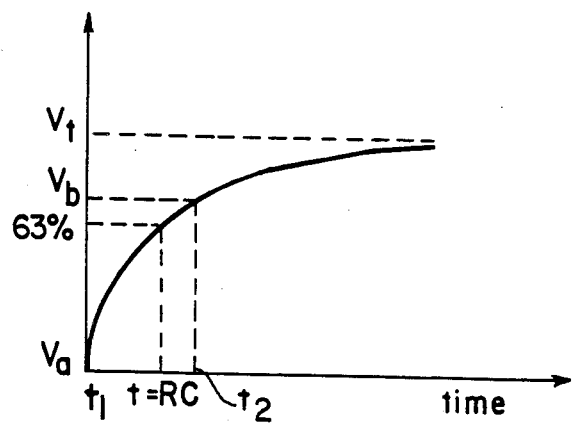
FIG. 7 is a plot illustrating the response of conditioning circuits in the remote processing unit in FIG. 2 to a step change input which is used to demonstrate the manner in which adaptive time constant calculations are carried out in accordance with the teachings of the invention.

Another feature of the present invention is an adaptive settling time calculation. Since the settling time constants can vary from channel to channel and since it may be necessary to change these time constants in the field, it is desirable to be able to accomplish the task automatically to avoid the high cost of modifying the software. The solution is to measure the time constants while the system is on-line using the following method. A unit step change input to a single pole low pass filter such as those used in the conditioning circuits generates a response having the characteristics illustrated in FIG. 7. The voltage at any time (t) can be computed using the well-known equation:

$$V = V_T(1 - e^{-t/RC}) \qquad \text{(Equation 7)}$$

As is also well-known, the voltage at the time $t = RC$, which is defined as the time constant, is equal to 63% of the final voltage $V_T$, or in other words, the signal is 63% settled after one time constant. Using this to calculate the time constant, the low reference for the channel is switched in and permitted to settle; preferably, for a period of about nine time constants, after which the signal is 99.99% settled. If lower accuracy is acceptable, 99% settling is achieved after a waiting period of about five time constants. The previously calculated time constant (or the theoretical value for initial start-up) is used for this purpose. After the channel has settled, at time, $t_1$, the output, $V_1$, is read and saved. At that time, the high reference is switched in. At some arbitrary time, $t_2$, later (preferably somewhere near the previously calculated value for the time constant) the output, $V_2$, is read and saved. By substituting these variables into equation 7 and solving them simultaneously for the time constant, RC, the following formula is derived:

$$RC = \frac{t_2 \ln V_b - t_1 \ln V_a}{\ln (V_b - V_a)} \qquad \text{(Equation 8)}$$

Thus, by plugging the recorded values into equation 8, the current time constant for the channel can be calculated. Certainly, the time constant should be calculated each time the system is started up since a circuit might have been modified while shutdown. It can be recalculated when the temperature varies by a preset amount, and/or periodically. The calculated time constants for each channel, multiplied by 9 to achieve 99.99% settling, may be stored in a table for use by the self-test, self-calibration program whenever it calls for waiting the appropriate settling time. In the preferred embodiment of the invention, a three pole filter with a Butterworth characteristic is used in the signal conditioning electronics. With this filter, 99.99% settling is achieved with less settling time than with a single pole filter. The specific waiting period for each channel is selected on the basis of the calculated time constant and the desired accuracy for that signal.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for conditioning and calibrating a raw electrical signal comprising:
    a printed circuit board having an input termination for said raw electric signal, a conditioning circuit connected to the input termination for conditioning the raw electrical signal to generate a conditioned electrical signal and an output termination for outputting the conditioned electrical signal;
    test means for selectively disconnecting the conditioning circuit from the input termination and for connecting test signals of known magnitude to the conditioning circuit;
    processing means connected to said output termination, for calibrating the conditioning circuit by controlling said test means to connect said test signals to said conditioning circuit to generate conditioned test signals, generating a calibration factor as a function of said test signals and said conditioned test signals, operating said test means to reconnect said raw electrical signal to said conditioning circuit so that said conditioned electrical signal again appears on said output termination and applying said calibration factor to said conditioned electrical signal to generate a calibrated conditioned electrical signal; and
    monitoring means including temperature sensing means for sensing the temperature of said conditioning circuit, said processing means being responsive to the temperature sensed by said sensing means to perform said calibration when said temperature changes by a preselected amount since the last calibration.

2. The apparatus of claim 1 wherein said monitoring means also includes clock means and wherein said processing means is responsive to said clock means and to said temperature sensing means and performs said calibration when a preselected interval has elapsed and when said preselected temperature change has occurred since the last calibration was performed.

3. The apparatus of claim 1 wherein said test means includes a signal generating circuit on said printed circuit board and switch means operated by said processing means to selectively one at a time connect the raw electrical signal and the signal generating circuit to said conditioning circuit.

4. The apparatus of claim 3 wherein said signal generating circuit includes means for generating a low test signal having a magnitude in the low range for the raw electrical signal and a high test signal having a magnitude in the high range for the raw electrical signal and wherein said switch means includes means controlled by said processing means for selectively, individually applying to said conditioning circuit said low test signal and said high test signal.

5. A method of remotely calibrating a signal conditioning circuit on a printed circuit board which conditions a field generated electrical signal connected to the conditioning circuit to generate a conditioned output signal therefrom which is applied to a signal processing unit, where the signal conditioning circuit contains reactive components which require time for the conditioned output signal to settle down in response to an applied signal, said method comprising the steps of:
    sending an electrical signal from said processing unit to said printed circuit board to disconnect said field generated signal from said conditioning circuit;
    applying under the direction of said processing unit test signals of known magnitude to said conditioning circuit in place of the field generated electrical signal to generate conditioned test signals which are applied to said processing unit;
    waiting for a selected period of time after applying the test signal to the signal conditioning circuit for the conditioning circuit to settle;
    generating in the signal processing unit after said waiting period a calibration factor as a function of said test signals and said conditioned test signals;
    disconnecting said test signals from said conditioning circuit and reapplying said field generated electrical signal;
    applying said calibration factor to said conditioned output signal to generate a calibrated conditioned output signal; and
    periodically determining the time constant of said conditioning circuit and selecting said waiting period as a function of said time constant.

6. The method of claim 5 wherein said printed circuit board includes a plurality of conditioning circuits each with reactive components and to each of which a field generated signal is applied, wherein said processing unit sequentially connects test signals to each of the conditioning circuits in place of the field generated signal and generates therefrom after a waiting period of calibration factor which is applied to the field generated signal after it is reconnected to the conditioning circuit, and wherein the time constant of each of said conditioning circuits is periodically separately determined and used to determine the waiting period for each conditioning circuit.

7. The method of claim 6 wherein the time constant of each conditioning circuit is determined by applying a first test signal of a first magnitude to said conditioning circuit and at a first time $t_1$, after said circuit has settled, storing the output of the conditioning circuit as $V_a$, removing said first test signal and applying a second test signal of different magnitude to the conditioning circuit and at a later time $t_2$ storing the output of the conditioning circuit as $V_b$, and calculating the time constant, RC, by the equation:

$$RC = \frac{t_2 \ln V_b - T_1 \ln V_a}{\ln (V_b - V_a)}$$

8. The method of claim 7 wherein said waiting period is selected to be at least about 5 times the time constant.

9. The method of claim 5 including the step of monitoring a selected condition of the conditioning circuit and wherein said electrical signal is sent from said processing unit to said printed circuit board to disconnect said field generated signal and apply said test signal when said monitored condition undergoes a predetermined change in value.

10. The method of claim 9 wherein said step of monitoring a selected condition comprises monitoring the temperature of said printed circuit board and wherein said electrical signal is sent from the processing unit to disconnect the field generated signal and apply the test signal to the conditioning circuit when said temperature has changed a predetermined amount since the last time the conditioning circuit was calibrated.

11. The method of claim 10 wherein said predetermined change in temperature is about 10° Fahrenheit.

12. The method of claim 9 wherein said step of monitoring a selected condition comprises monitoring the time elapsed since the last time the conditioning circuit was calibrated and wherein said electrical signal is sent from said processing unit to said printed circuit board to disconnect said field generated signal and apply said test signal to said conditioning circuit when said elapsed time reaches a predetermined value.

13. The method of claim 12 wherein said step of monitoring a selected condition also includes monitoring the temperature of the conditioning circuit and wherein said electrical signal is sent from the processing unit to said printed circuit board to disconnect said field generated signal and apply said test signal to said conditioning circuit when said temperature changes by a preselected amount since the last time the conditioning circuit was calibrated as well as when said predetermined time has elapsed since the last calibration.

14. The method of claim 5 wherein said step of applying test signals to said conditioning circuit includes applying a first test signal having a value, "a", which is approximately that of the expected full scale low value of the field generated signal, and measuring and storing the corresponding output signal from the conditioning circuit as, "lo", applying a second test signal having a value, "b", which is approximately that of the expected full scale high value of the field generated signal and measuring and storing the corresponding output signal from the conditioning circuit as, "hi", and wherein said step of generating said calibration factor includes generating a gain, "g", according to the equation:

$$g = (hi - lo)/(b - a)$$

and generating an offset, "c", according to the equation:

$$c = hi - g*b$$

and wherein said step of applying said calibration factor to said conditioned output signal comprises multiplying in said processing unit said conditioned output signal by "g" and adding to the product, "c" to generate the calibrated conditioned output signal.

15. A method of remotely calibrating a plurality of signal conditioning circuits which are mounted in groups on printed circuit boards and which condition field generated electrical signals connected thereto to generate conditioned output signals which are applied to a signal processing unit, said method comprising the steps of:
  monitoring the temperature of said conditioning circuits;
  sequentially under the direction of said processing unit calibrating each of said conditioning circuits when the temperature of said conditioning boards varies by a preselected amount since the last calibration to generate a calibration factor therefore and storing the calibration factor for each conditioning circuit; and
  applying in said processing unit to each of the conditioned output signals the associated stored calibration factor.

16. The method of claim 15 wherein the step of sequentially under the direction of said processing unit calibrating each of said conditioning circuits comprises simultaneously calibrating one conditioning circuit on each of several printed circuit boards.

17. Apparatus for conditioning and calibrating raw electrical signals comprising:
  a plurality of printed circuit boards each having a plurality of input terminations for said raw electrical signals, conditioning circuits connected to each of the input terminations for conditioning each of the raw electrical signals to generate conditioned electrical signals, and output terminations for outputting the conditioned electrical signals;
  test means on each printed circuit board including a test bus, on board test signal generating means for generating an internal test signal, an off board test signal for generating an external test signal, internal/external switch means, responsive to an internal/external select signal for separately selectively applying the internal and external test signals to the test bus, and test injection means responsive to a board enable signal, and a test address signal for disconnecting a selected raw electrical signal designated by said test address signal from its conditioning circuit and connecting said test bus thereto, and responsive to the absence of a board enable signal for reconnecting said conditioning circuit to said input termination; and
  processing means connected to said output termination and including means for generating a board enable signal for selected boards, a test address signal for each selected board designating the conditioning circuit on that board to be tested and an internal/external select signal, waiting a selected settling interval for conditioned test signals produced by the designated conditioning circuits to stabilize, generating a calibration factor for each selected conditioning circuit as a function of the test signals and conditioned test signal, terminating the board enable signal to reconnect the raw electrical signals to the conditioning circuits, and applying the calibration factors to the conditioned electrical signals to generate calibrated conditioned electrical signals.

18. The apparatus of claim 17 wherein said test injection means includes decoding means on each said printed circuit board which receives said test address signal and said enable signal from said processing unit and test signal injecting switch means associated with each conditioning circuit responsive to an enable signal to connect the conditioning circuit to the test bus, said decoding means being operative to apply the enable signal from the processing unit to the test signal injecting switch means associated with the selected conditioning circuit.

19. The apparatus of claim 18 wherein said on board test signal generating means includes means for generating a low on board test signal having a magnitude at the low end of the range of the raw electrical signal associated with the selected conditioning circuit and a high on board test signal having a magnitude in the high range of the same raw electrical signal, and high/low selection means responsive to a high/low test range signal for selectively connecting the selected on board test signal generator to the test bus and wherein said processing unit generates the high/low test range signal indicating the signal generator to be selected.

20. The apparatus of claim 19 wherein said processing unit calibrates said conditioned electrical signal by generating a calibration factor as a straight line function of the high and low test signals and the conditioned test signals generated in response thereto.

* * * * *